United States Patent [19]

Bross

[11] 4,126,219
[45] Nov. 21, 1978

[54] BOLUS ORIENTER

[75] Inventor: Charles F. Bross, Chicago, Ill.

[73] Assignee: Pennwalt Corporation, Philadelphia, Pa.

[21] Appl. No.: 827,490

[22] Filed: Aug. 25, 1977

[51] Int. Cl.² .............................................. B65G 47/24
[52] U.S. Cl. ..................................... 198/382; 198/384; 198/425; 198/844; 198/850
[58] Field of Search ............... 198/382, 384, 404, 408, 198/445, 459, 425, 844, 841, 482, 850

[56] References Cited

U.S. PATENT DOCUMENTS

| 2,054,247 | 9/1936  | Dilger et al.      | 198/384 |
| 2,785,786 | 3/1957  | Bartlett           | 198/646 |
| 3,083,810 | 4/1963  | Zebarth et al.     | 198/646 |
| 3,153,473 | 10/1964 | Margaroli et al.   | 198/384 |
| 3,273,615 | 9/1966  | Aguilar            | 198/382 |
| 3,556,281 | 1/1971  | Margaroli          | 198/384 |
| 3,851,748 | 12/1974 | Garton             | 198/425 |
| 3,933,068 | 1/1976  | Rejsa              | 198/841 |
| 3,973,668 | 8/1976  | Stansfield         | 198/688 |

Primary Examiner—Joseph E. Valenza
Attorney, Agent, or Firm—Charles N. Quinn

[57] ABSTRACT

Apparatus for delivering boluses into recurring arrays of longitudinally moving receptacles has an endless conveyor of connected slats with recesses for receipt of boluses. The slats travel in two opposed parallel tracks. Spaced parallel guides segregate boluses horizontally in a conveyor filling area. In one embodiment transverse dividers protrude to separate adjacent slats in the conveyor filling area and retract outside the filling area, allowing the conveyor to deliver boluses into recurring arrays of moving receptacles as the slats move substantially complementally with the receptacles.

6 Claims, 11 Drawing Figures

BOLUS ORIENTER

BACKGROUND OF THE INVENTION

This invention relates to apparatus for delivering a plurality of generally rounded solids such as pharmaceutical pills, tablets or capsules (such pharmaceutical products being collectively referred to hereinafter as "boluses") to a longitudinally moving web having recurring arrays of receptacles formed therein.

DESCRIPTION OF THE PRIOR ART

Apparatus for delivering articles to moving conveyors having receptacles for the articles are disclosed in U.S. Pat. Nos. 2,190,970, 2,936,059, and 3,153,473. The 2,190,970 patent discloses conveyors timed to transfer fruit from one conveyor to the other by gravity. Each conveyor is formed with horizontal slats having indentations receiving the fruit. The 2,936,059 patent shows a first conveyor having disks with cutouts receiving bottles, one bottle at a time. A second conveyor has disks with fingers on the disk surfaces to hold the bottles as the bottles are received. A third endless belt nudges bottles out of the cutout disks onto the fingered disks. The 3,153,473 patent shows two sets of buckets, on separate belts, with transfer of fruit from one belt's buckets to the second belt's buckets at a selected location. The conveyor passes through a hopper containing the fruit and includes a plurality of closely spaced parallel rubber bars, each with fruit receiving pockets.

Apparatus known heretofore, as disclosed in the 2,190,970, 2,936,059 and 3,153,473 patents, while inserting articles in pockets in moving conveyors and then transferring the articles from one conveyor to another, does not orient a plurality of boluses into recurring arrays and then deposit the individual boluses into longitudinally moving receptacles, disposed as recurring arrays in a moving web. Advent of plastic blister packaging has created a need for apparatus to place boluses into individual receptacles disposed as recurring arrays in a moving plastic web, preparatory to sealing the receptacles.

SUMMARY OF THE INVENTION

This apparatus delivers boluses into recurring arrays of longitudinally moving receptacles and includes an endless conveyor of connected parallel slats having recesses for receipt of boluses. Spaced parallel guides segregate the boluses horizontally in a conveyor filling area. The conveyor delivers boluses into moving receptacles with the slats moving substantially complementally with the receptacles. In one embodiment transverse dividers separate the slats and travel with the slats in opposed parallel tracks. The transverse dividers protrude upwardly past the slats thereby separating adjacent slats while in the conveyor filling area, and retract to positions at least flush with the slats when outside the filling area.

DESCRIPTION OF THE PREFERRED EMBODIMENTS

Figure 1:
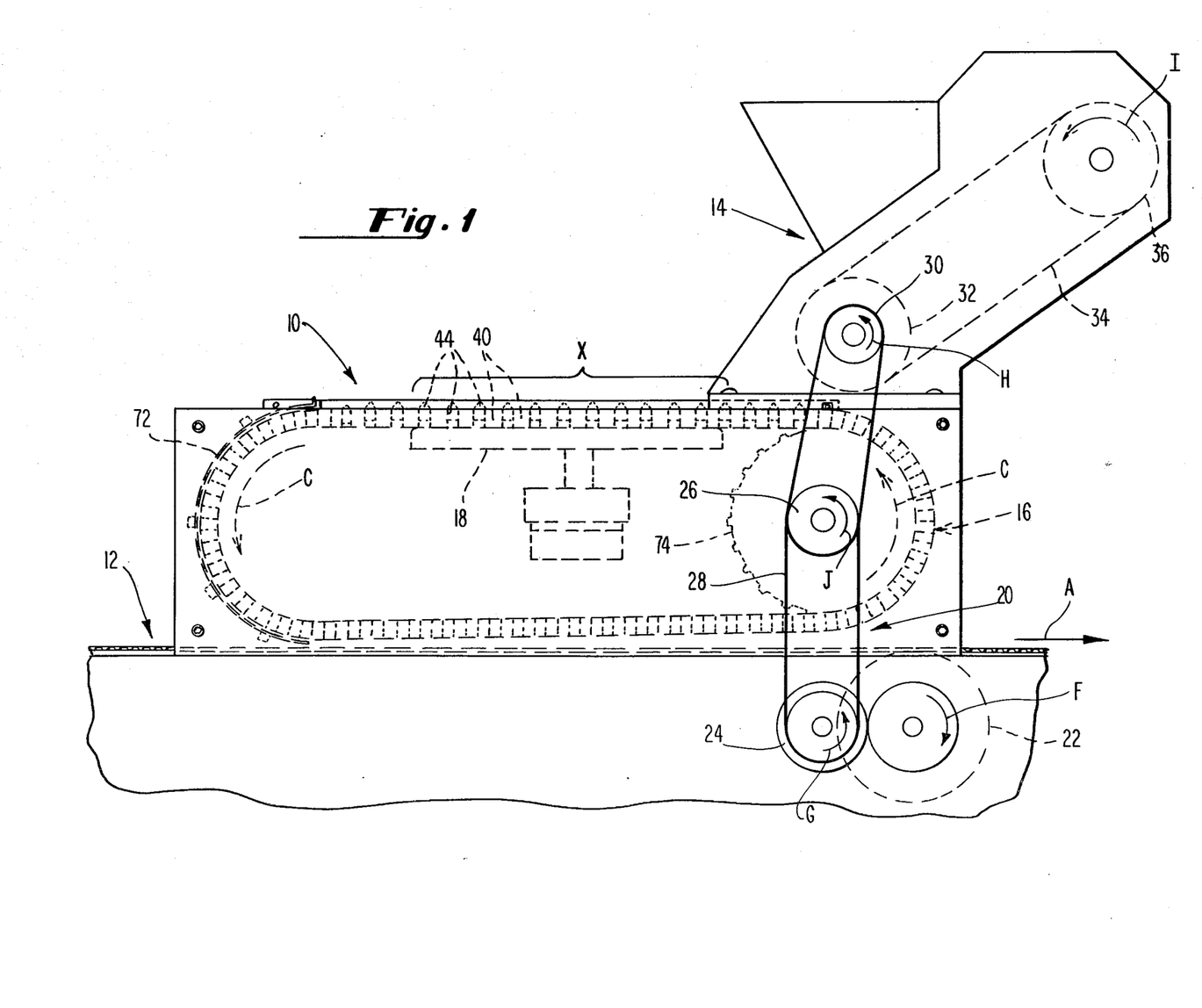
FIG. 1 is a schematic side elevation of the preferred embodiment of the bolus orienter in combination with a bolus feed apparatus.

Referring to FIG. 1, the preferred embodiment of the bolus orienter, designated generally 10, preferably receives boluses from a product feeder, designated 14, and delivers boluses to receptacles disposed as recurring arrays in a moving web, designated generally 12. Within bolus orienter 10 is an endless conveyor, designated generally 16 and moveable in the direction indicated by arrows C, and a vibrator designated generally 18, which vibrates slats in the conveyor while the conveyor passes through bolus filling area denoted generally by bracket X. Means for moving conveyor 16 at the same speed as web 12 is denoted generally 20 and is illustrated schematically. Conveyor movement means 16 includes a bolus orienter driven wheel 26, rotatable as shown by arrow J and receiving power via power transmision means, preferably a belt or a chain, designated 28, powered by bolus orienter drive wheel 24 turning as indicated by arrow G. A wheel 22 associated with moving web 12 rotates, as shown by arrow F, such that its rim moves unitarily with web 12; this wheel drives bolus orienter drive wheel 24 by contacting drive. Bolus feeder power transfer wheel 30 is rotated as shown by arrow H by transmission means 28 and rotates bolus feeder drive wheel 32, being mounted on a common shaft therewith. Bolus feeder driven wheel 36 is turned as indicated by arrow I by power transmission means 34 coupled to drive wheel 32. All of these power transmission elements are shown schematically and are conventional. Any suitable mechanical drive, such as a gear drive, which moves the bolus orienter conveyor at the same rate as the moving web and which acts on the product feeder to cause it to feed boluses into the bolus orienter at a proper orientation and at a rate adequate to fill the bolus orienter, may be used.

Figure 10:
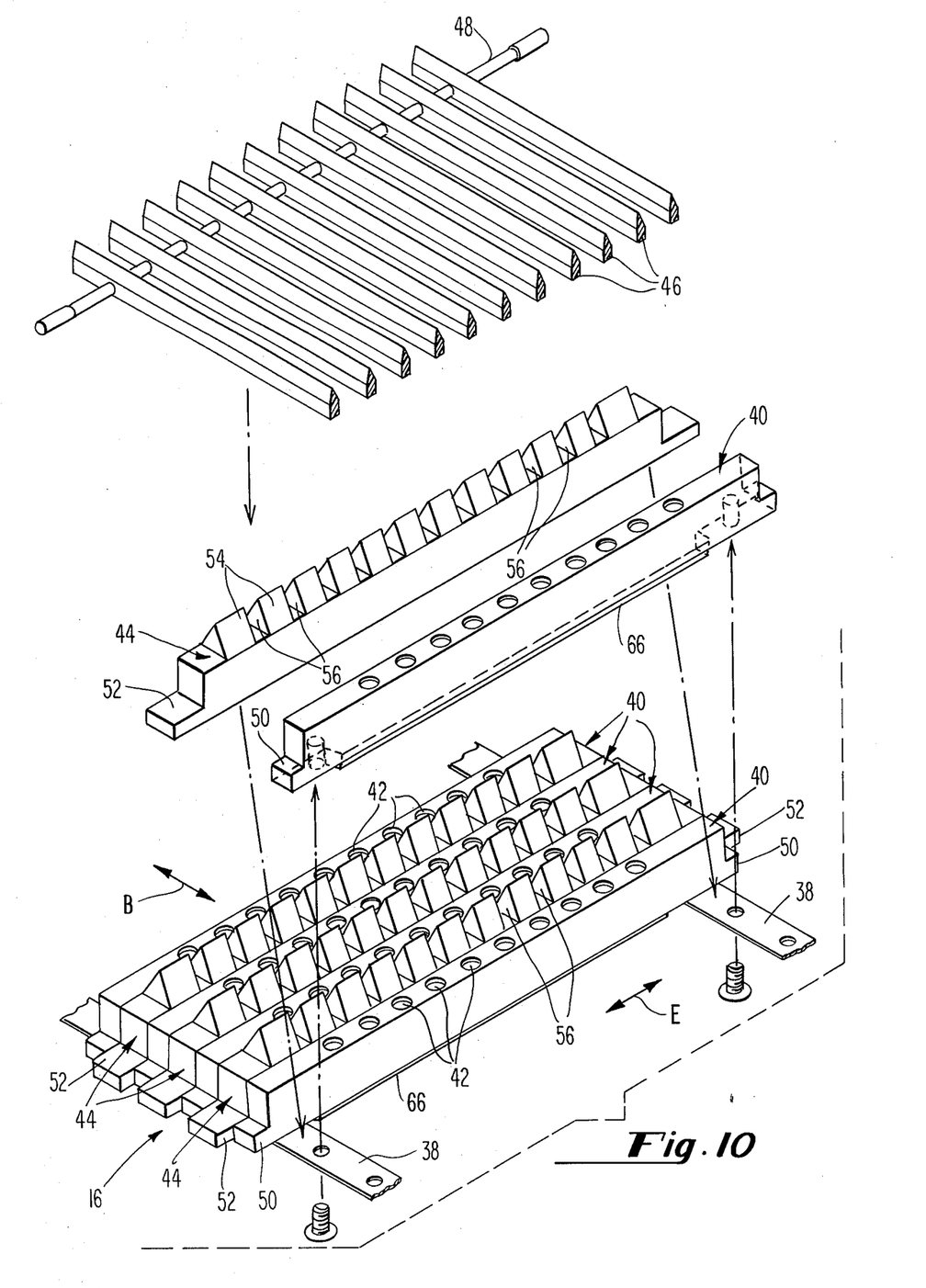
FIG. 10 is an exploded isometric view of a portion of the conveyor-divider-guide assembly of the preferred embodiment of the bolus orienter.

Referring to FIG. 10, endless conveyor 16 includes a pair of flexible strips 38 to which are secured a plurality of parallel receptacle slats designated generally 40. The flexible character of strips 38 insures that the slats are slightly rotatable with respect to each other, to follow curves in the conveyor path. Spaced across top surfaces of slats 40 are a plurality of recesses, each designated 42, for receiving individual boluses. Width-wise spacing of recesses 42 along a single slat 40 and longitudinal spacing of adjacent slats 40 are dictated by dimensions of web 12 and associated receptacles into which boluses are deposited. (Although the illustrated preferred embodiment of the bolus orienter places boluses into parallel rows of receptacles, by substituting a particular arrangement of slats, having a chosen pattern of recesses therein, for the slatrecess configuration shown, the boluses orienter can be adapted to deliver boluses to any recurring array of receptacles in the moving web.) Interposed between adjacent receptacle slats 40 are retractable dividers designated generally 44. Dividers 44 are not secured to strips 38 but are retained by two tracks, not shown in FIG. 10, in which divider end tabs 52 reside. Receptacle slats 40 also have end tabs designated 50 which reside in the tracks. Receptacle slat end tabs 50 are shorter, in the transverse direction indicated by arrow E, than divider end tabs 52. Each divider has spaced therealong a plurality of upstanding protruding separating means configured as wedges, each designated 54, with adjacent wedges spaced apart a distance defining divider slots 56. Wedges 54 are interposed between recesses 42 which would otherwise be longitudinally adjacent one to another with the longitudinal direction indicated by arrow B. Divider slots 56 receive guides 46 spaced apart and supported by guide support bars 48. Guides 46 are above the conveyor in the filling area denoted by bracket X in FIG. 1 and are maintained stationary while dividers 44 move therealong as the conveyor travels in the longitudinal direction. Each guide resides within a number of divider slots 56 simultaneously as dividers 44 travel through the bolus filling area.

Figure 5:
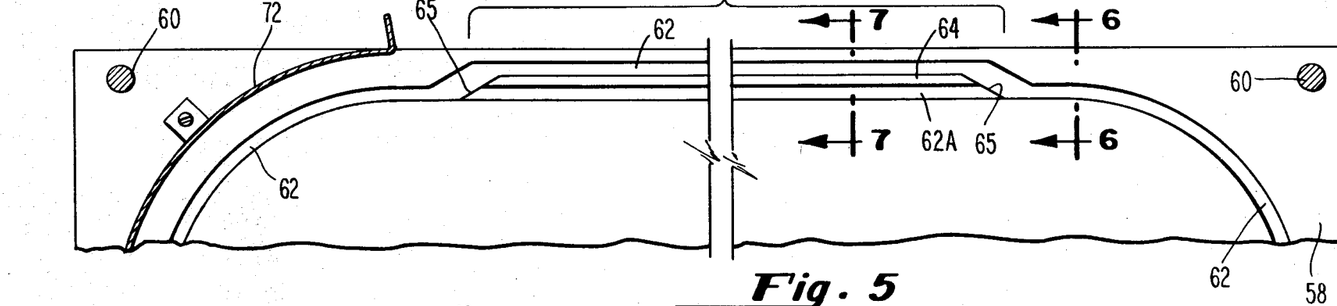
FIG. 5 is a partial side view of the top portion of a side plate of the bolus orienter, viewed from inside the bolus orienter and looking in the same direction as the view of FIG. 2.
Figure 6:
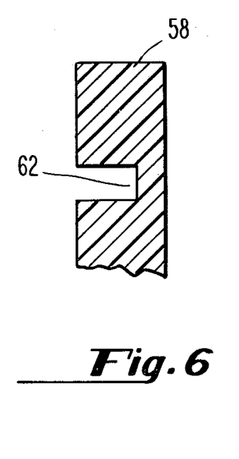
FIG. 6 is a broken sectional view taken at arrows 6—6 in FIG. 5.
Figure 7:
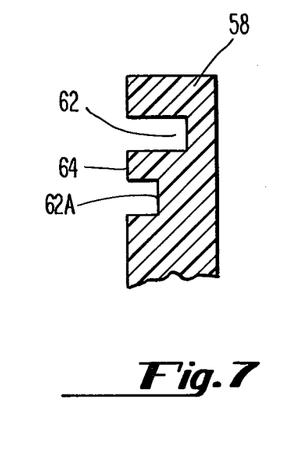
FIG. 7 is a broken sectional view taken at arrows 7—7 in FIG. 5.
Figure 8:
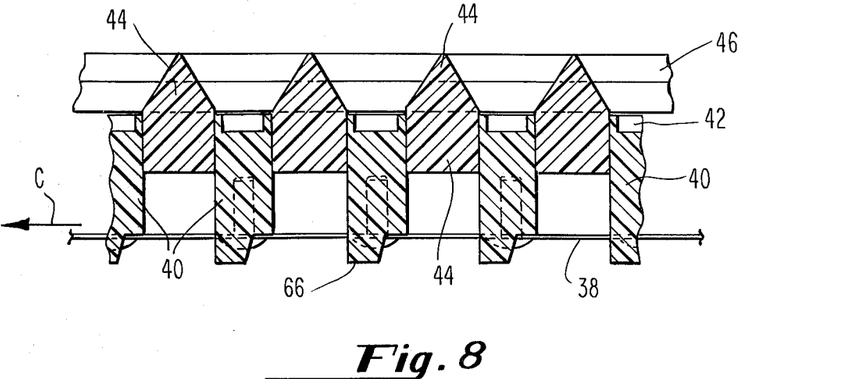
FIG. 8 is a broken side sectional view of the conveyor portion of the preferred embodiment of the bolus orienter.

Referring to FIG. 5, the bolus orienter has two side plates 58 connected via pins 60. A pair of generally oval-shaped tracks 62, one in each side plate, defines the path of travel of endless conveyor 16. Track 62 has a shallow portion, designated 62A, in the bolus filling area denoted by bracket X, with shallow portion 62A separated from the main portion of track 62 by longitudinal cam 64. The relationship of track 62, shallow portion 62A and longitudinal cam 64 is illustrated in the sectional views of FIGS. 6 and 7.

Longitudinal extremities of track shallow portion 62A and longitudinal cam 64 are beveled as indicated by 65 in FIG. 5. The bevel facilitates separation of receptacle slat end tabs 50 from divider end tabs 52 as receptacle slats 40 and retractable dividers 44 move into the filling area, with receptacle slat end tabs 50 entering track shallow portion 62A while divider end tabs 52 remain in track 62.

Figure 3:
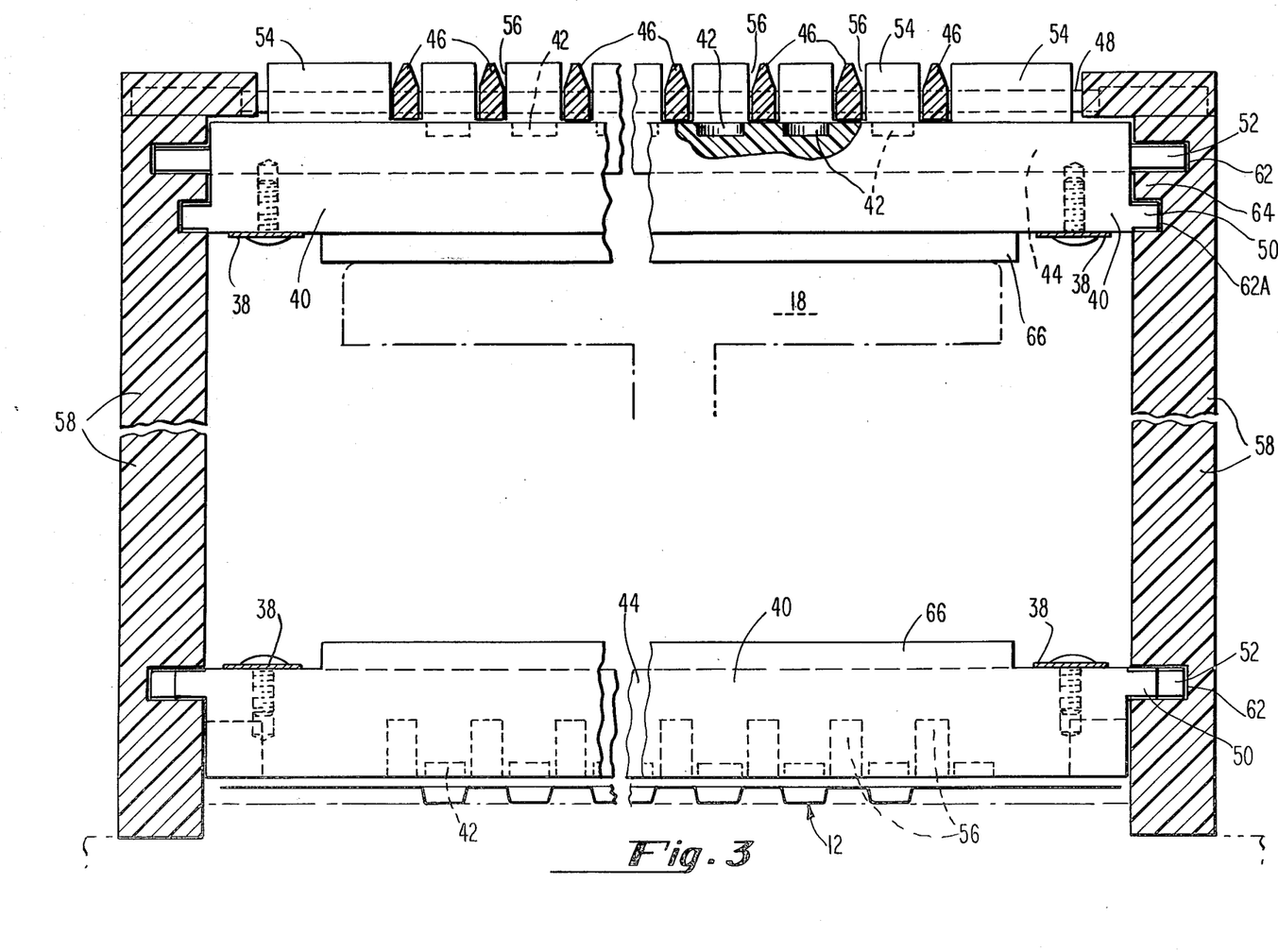
FIG. 3 is a sectional view taken at arrows 3—3 in FIG. 2.
Figure 4:
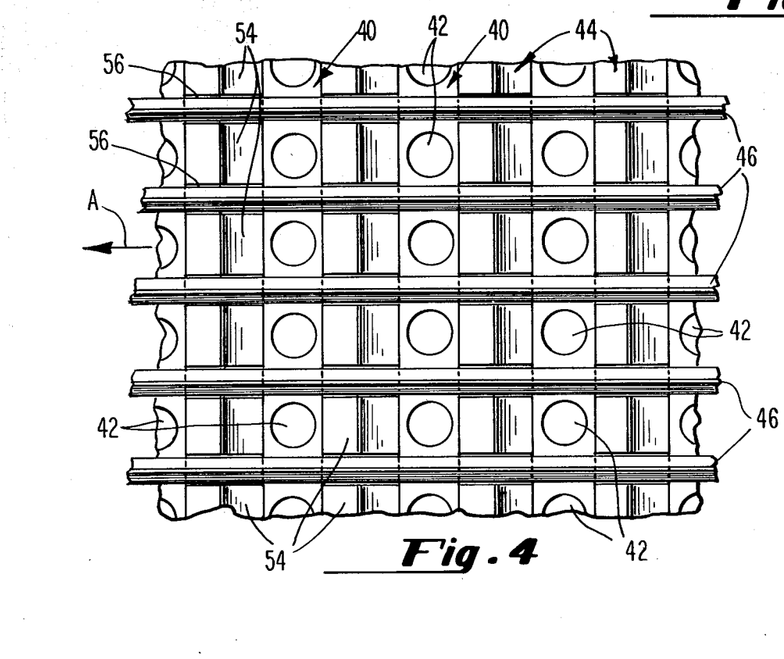
FIG. 4 is a broken top view taken at arrows 4—4 in FIG. 2.

Referring to FIG. 3, the upper portion of FIG. 3 illustrates the relationship between receptacle slats 40, retractable dividers 44 and guides 46 when the conveyor is in the filling area, while the lower portion of FIG. 3 illustrates the relationship between receptacle slats 40 and retractable dividers 44 outside the filling area. Referring particularly to the upper portion of FIG. 3, within the filling area receptacle slat end tabs 50 reside in shallow portion 62A of the track while divider end tabs 52 reside in the main portion of track 62, vertically above shallow portion 62A. When receptacle slats 40 and retractable dividers 44 are in this area, longitudinal cam 64, separating the two portions of the track, displaces retractable dividers 44 upward to a position where divider upstanding wedges 54 are in interdigitated relationship with guides 46, with guides 46 slideably resident within divider slots 56. The vertical extremity of each receptacle slat is slightly below the bottom of guides 46. Guides 46 in combination with retractable dividers 44 define a mesh through which individual boluses pass to enter recesses 42, when dividers 44 are in the filling zone and have been displaced upwardly by longitudinal cam 64. This mesh is best illustrated in FIG. 4 where direction of conveyor travel is denoted by arrow A.

Referring to the lower portion of FIG. 3, showing the configuration of the conveyor outside the filling zone where both receptacle slat end tabs 50 and divider end tabs 52 are within track 62 and are contiguous, rectractable dividers 44 are positioned with wedges 54 flush with surfaces of receptacle slats 40 in which recesses 42 are formed. Thus a substantially planar surface is presented to moving web 12 so as boluses drop out of recesses 42 and into receptacles forming recurring arrays in the web, there is substantially no danger of boluses failing to enter the chosen receptacle in the web.

Figure 2:
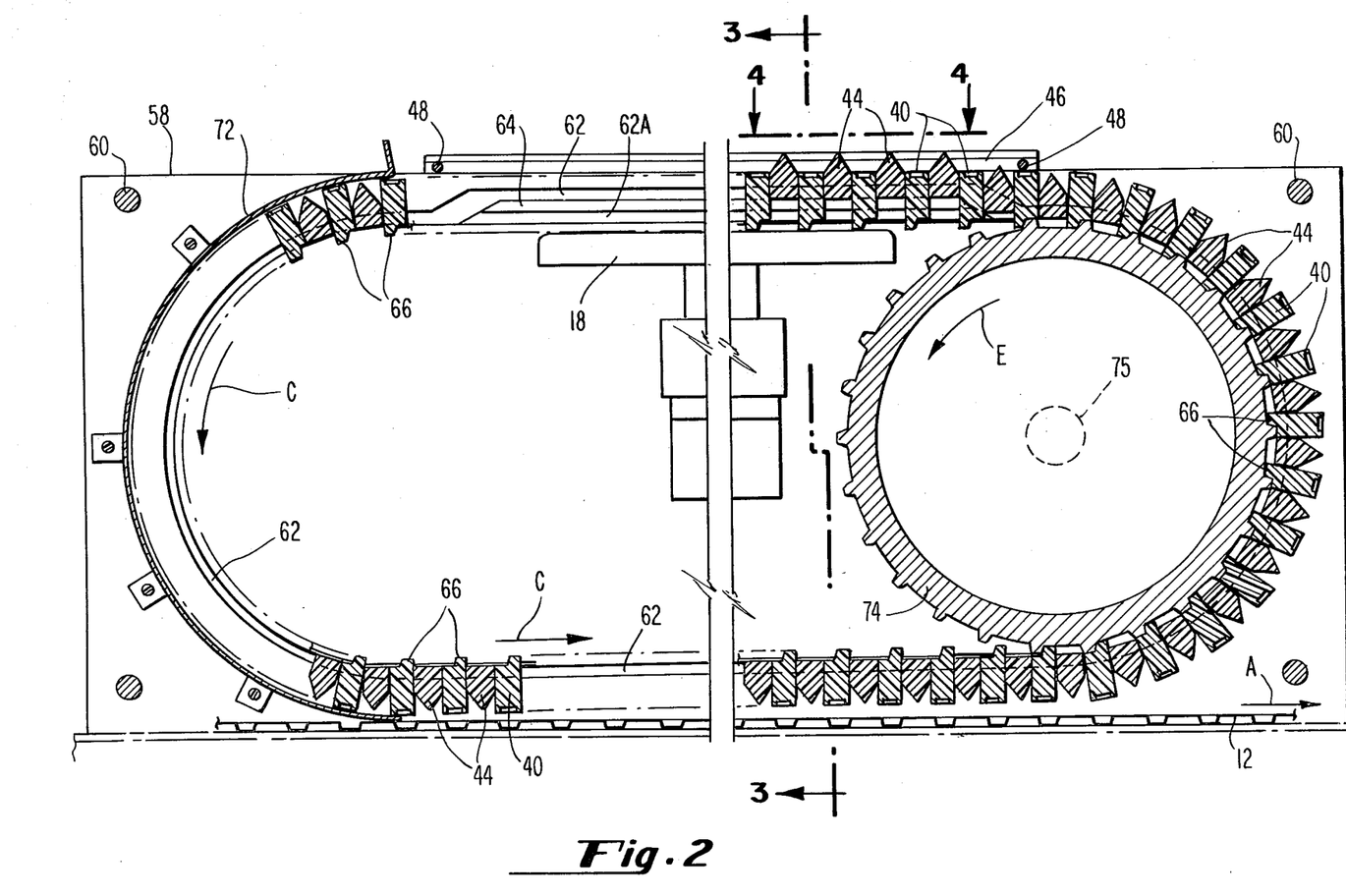
FIG. 2 is a side sectional view of the preferred embodiment of the bolus orienter.

Referring to FIG. 2, endless conveyor 16 is advanced around the path defined by parallel opposed tracks 62 by notched wheel 74, which rotates on a common axle 75 with bolus orienter driven wheel 26 as shown in FIG. 1. Teeth on wheel 74, between which notches are formed, contact vibration receipt tabs 66 extending downwardly from receptacle slats 40. Thus as wheel 74 rotates in the direction shown by arrow E, endless conveyor 16 travels along track 62 and advances in the direction shown by arrow C. Due to interconnection of receptacle slats 40 by conveyor strips 38, as shown in FIG. 10, rotation of wheel 74 and consequent advancement of those receptacle slats 40 which are in contact therewith results in all receptacle slats 40 traveling around track 62. Rectractable dividers 44, although not contacted by wheel 74 and not secured to conveyor strips 38, are pushed along track 62 by adjacent receptacle slats in contact therewith.

Still referring to FIG. 2, receptacle slats 40, while in the bolus filling area denoted by bracket X, are vibrated by vibrator 18 which contacts downwardly extending vibration receipt tabs 66 of receptacle slats 40.

Boluses are transferred from bolus feed apparatus 14 to bolus orienter 10 as recesses 42 in slats 40 pass under product feeder 14 and enter the conveyor filling area, where extended dividers 44 and guides 46 form a mesh with openings above recesses 42. Transfer of boluses from product feeder 14 to recesses 42 is accomplished via suitable funnels through which boluses are released for each recess 42 in a receptacle slat 40. In the embodiment shown, when a single bolus enters an empty recess 42, the bolus falls thereinto and remains since vibration applied to the slats is insufficient to cause the bolus to "jump" out of the recess. Should a bolus enter the recess and stand on edge or on its side, with the bolus center of gravity relatively high in the recess, applied vibration causes the bolus to quickly fall to a more stable position, with the bolus center of gravity low in the recess. Although in the illustration recesses 42 are deep enough only to accommodate a single bolus, the bolus orienter may be constructed with recesses 42 of sufficient depth to receive a plurality of boluses to thereby deliver a plurality of boluses to each receptacle in web 12.

Figure 9:
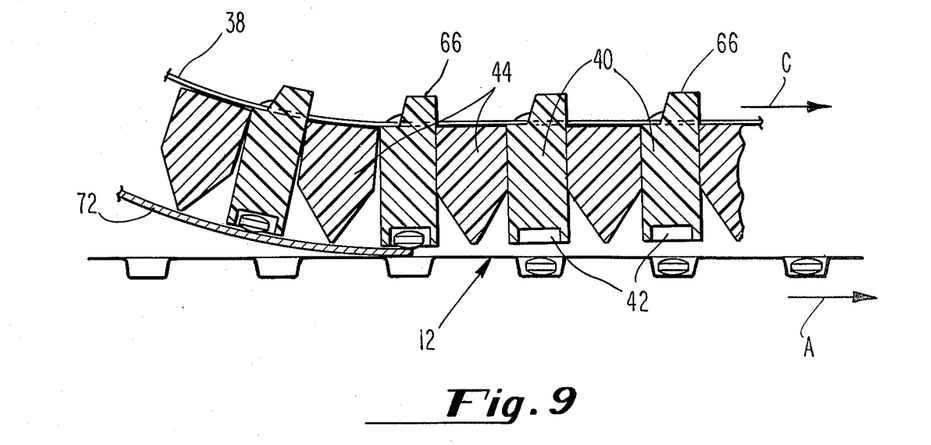
FIG. 9 is a partial side sectional view of the conveyor portion of the preferred embodiment of the bolus orienter, taken at the location at which individual boluses are fed from the conveyor into moving receptacles.

After receptacle slats 40 leave the filling area with boluses resident in recesses 42, the conveyor path defined by tracks 62 curves downwardly, as shown at the upper left portions of FIGS. 1 and 2. Curved bolus retention sheet 72 is substantially parallel to and nearly coplanar with the surfaces of moving receptacle slats 40, in which recesses 42 are formed, around curved left-hand (as viewed in FIGS. 1 and 2) portions of tracks 62, until receptacle slats 40 are moving almost horizontally along the lower portion of tracks 62 where boluses fall from recesses 42 into receptacles in moving web 12. The configuration of bolus retention sheet 72 at the lower portion of tracks 62 and action of boluses falling into the receptacles is best shown in FIG. 9.

Figure 11:
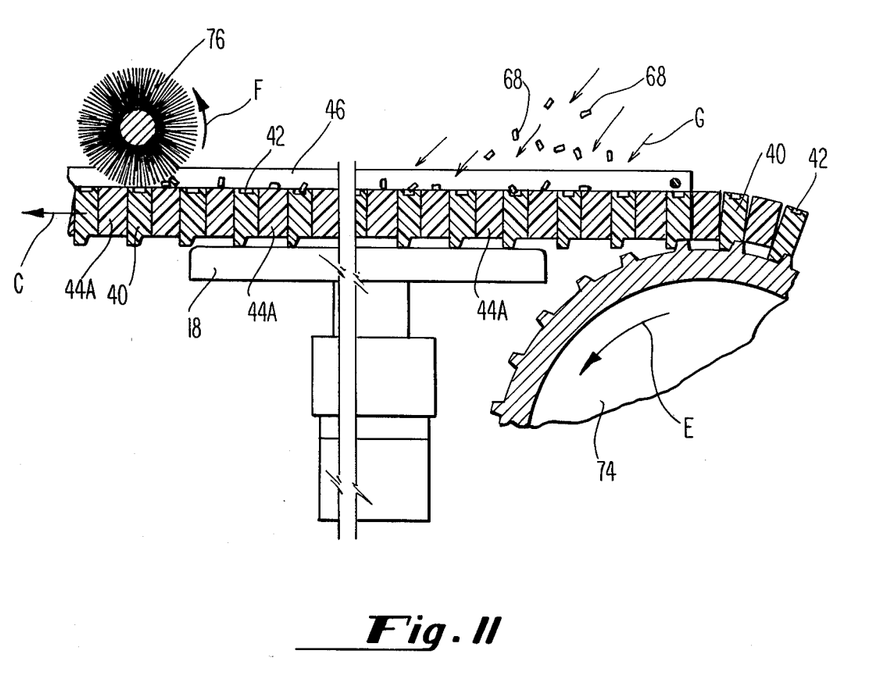
FIG. 11 is a partially broken side sectional view of a conveyor assembly, in the filling area, of a second embodiment of the bolus orienter.

The bolus orienter can accept boluses directly from a product feeder, as shown in FIG. 1, or in a "flood-feeding" mode where boluses are randomly dropped into the filling area at one end thereof, as depicted in FIG. 11. (In the flood-feeding mode, no product feeder 14 need be used.) When boluses are received from a product feeder, the boluses may already be aligned in parallel rows so minimal vibration of boluses over the filling area is necessary. However when boluses are received in a flood-feeding mode, with boluses randomly raining down on the receptacle slats and the dividers, more vibration-induced migration is desirable so that each recess 42 in a receptacle slat is filled with a single bolus when the slat leaves the filling area.

FIG. 11 illustrates a second embodiment of the bolus orienter, suitable for use when boluses are flood-fed to the bolus orienter. Only the upper portion of the bolus orienter has been illustrated since the lower portion of the bolus orienter and the bolus orienter drive means for this embodiment are substantially the same as those of the embodiment illustrated in FIGS. 1 through 10. In the second embodiment illustrated in FIG. 11, receptacle slats 40, notched wheel 74, vibrator 18 and guides 46 are all substantially the same as those illustrated in FIGS. 1 through 10. Arrows C and E respectively designate the direction of travel of conveyor 16 and wheel 74. A brush 76, which is preferably rotatable in the direction shown by Arrow F, contacts the planar upper surface of slats 40 and dividers 44 and serves as a slat surface stripping means for preventing boluses from leaving the bolus filling area unless the boluses are in one of recesses 42. Any suitable frame (not shown) may be used to connect brush 76 to the side plates designated 58 in FIGS. 1 through 10 and any suitable means, preferably coupled to bolus orienter driven wheel designated 26 in FIGS. 1 through 10, may be used to rotate brush 76.

In FIG. 11, dividers designated 44A have planar upper surfaces, with no protrusions or depressions thereover. This facilitates migration of boluses over upper surfaces of receptacle slats 40 as boluses rain down on the conveyor as depicted by Arrows G. Dividers 44A need not retract, in the second embodiment illustrated, since the divider upper surfaces (as viewed in FIG. 11) are planar and thus can move complementally with web 12 when the dividers are at the low area of the two tracks where boluses leave recesses in slats 40 and drop into receptacles in web 12. Since there is no need for dividers 44A to extend or retract in the embodiment illustrated, no track shallow portion 62A nor any longitudinal cam 64 is necessary in side plates 58.

Although it has not been illustrated, the bolus orienter may be constructed without dividers 44A, with additional receptacle slats 40 substituted therefor, to provide a surface with a high density of recesses per unit area in the filling area.

During operation of the second embodiment of the bolus orienter, as the boluses rain down on the filling area as shown in FIG. 11, the rebounding of the boluses as they collide with slats 40 and dividers 44A causes migration of individual boluses over the planar surface presented by slats 40 and dividers 44A. Application of vibration to receptacle slats 40 by vibrator 18 also contributes to bolus migration. As individual boluses fall into unoccupied recesses 42 in slats 40, they remain there. Boluses which have not fallen into unoccupied recesses are prevented from leaving the bolus filling area by contact with preferably rotating brush 76. As excess boluses collect on the upper planar surfaces of slats 40 and dividers 44A just to the right of brush 76 as viewed in FIG. 11, due to contact with brush 76, the excess boluses occupy any recesses 42 which happen to reach brush 76 unfilled. Thus, so long as a sufficient supply of boluses rains down on the conveyor, every recess 42 in a slat 40 leaving the filling area and passing under brush 76 is filled with a bolus.

Variations, including reversals of parts from those shown and other modifications, fall within the scope of this invention. The above particular description is by way of illustration and not of limitation. Changes, omissions, additions, substitutions, and/or other modifications may be made without departing from the spirit of the invention.

I claim the following:

1. Apparatus for delivering boluses into receptacles arranged in recurring arrays in a moving web, comprising:
   (a) an endless conveyor including rotatably connected slats, at least some of said slats having recesses for receipt of boluses, the number and spacing of recesses defined by spacing of said receptacles and said arrays, end tabs of said slats slidably resident in opposed tracks;
   (b) a pair of opposed tracks defining the path of said conveyor, a track upper portion defining a filling area wherein said conveyor travels longitudinally allowing boluses introduced to said conveyor to pursue said recesses;
   (c) spaced guides for dividing boluses into horizontally separate groups, extending over said filling area, above said conveyor, connected to said tracks;
   (d) retractable dividers interposed between and contacting adjacent slats and including divider end tabs resident within said tracks;
   (e) means for advancing said dividers to protruding positions relative to said slats in said filling area; and
   (f) means for moving said conveyor at the same speed as said longitudinally moving web.

2. Apparatus of claim 1 further comprising means for vibrating said slats within said filling area.

3. Apparatus of claim 1 wherein said divider advancement means further comprises a cam, contacting dividers in said tracks, for displacing dividers with respect to said slats.

4. Apparatus of claim 3 wherein said conveyor movement means includes a notched wheel engaging said conveyor, rotatable about an axis, coupled to an axle rotated by movement of said receptacles.

5. Apparatus of claim 3 wherein said cams extend the length of said filling area and separate a main portion of said track from a shallower track portion, wherein said divider end tabs are of greater length than said slat end tabs, wherein distance between end tabs of a single divider is greater than the distance by which said shallow portions of said tracks are separated.

6. Apparatus of claim 1 wherein all of said slats are identical, having spaced-apart recesses for receipt of boluses.

* * * * *